US012709124B2

(12) United States Patent
Busnelli et al.

(10) Patent No.: US 12,709,124 B2
(45) Date of Patent: Aug. 18, 2026

(54) SUSPENSION SYSTEM WITH PITCH STIFFNESS CONTROL

(71) Applicant: Rivian IP Holdings, LLC, Irvine, CA (US)

(72) Inventors: Fabio Busnelli, London (GB); Andrea Damiani, Irvine, CA (US); Ian Duncan, Jr., Corona, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 151 days.

(21) Appl. No.: 18/419,439

(22) Filed: Jan. 22, 2024

(65) Prior Publication Data

US 2025/0236149 A1 Jul. 24, 2025

(51) Int. Cl.
*B60G 17/016* (2006.01)
*B60G 17/015* (2006.01)

(52) U.S. Cl.
CPC ....... *B60G 17/016* (2013.01); *B60G 17/0152* (2013.01); *B60G 2400/0512* (2013.01)

(58) Field of Classification Search
CPC .............. B60G 17/0152; B60G 17/016; B60G 17/0161; B60G 17/0164; B60G 2400/106; B60G 2400/32; B60G 2400/34
See application file for complete search history.

(56) References Cited

U.S. PATENT DOCUMENTS 4,765,648 A * 8/1988 Mander ................ B60G 17/018 267/64.18
2015/0046031 A1* 2/2015 Gagliano ................ B60G 7/02 280/124.157
2021/0291611 A1* 9/2021 Bruno ................ B60G 17/0185
2023/0114717 A1* 4/2023 Boon .................. B60G 21/073 701/37
2023/0302864 A1 9/2023 Sartiaux et al.
2023/0302866 A1* 9/2023 Tong ...................... B60G 13/14
2024/0317007 A1* 9/2024 Henderickx ........... B60G 13/08
2025/0010679 A1* 1/2025 Taguchi ............ B60G 17/0152

* cited by examiner

*Primary Examiner* — Erick R Solis
(74) *Attorney, Agent, or Firm* — BAKERHOSTETLER

(57) ABSTRACT

A suspension system of a vehicle can provide configurable stiffness and damping characteristics. The system can include a plurality of shock absorbers, one or more valve assemblies, and a plurality of accumulators. The plurality of shock absorbers, which can be synchronous or non-synchronous, each correspond to a respective wheel of a vehicle. The valve assembly is configured for controlling hydraulic fluid in the plurality of shock absorbers to achieve a plurality of suspension modes affecting bounce, pitch, roll, and warp. The valve assemblies can be controlled to manage pitch stiffness of the vehicle in response to detected conditions, such as longitudinal and lateral dynamics, with overrides in response to vertical acceleration and/or damper displacement. Accordingly, the handling improvement provided by varying suspension modes is balanced with a desire to provide improved ride characteristics.

19 Claims, 8 Drawing Sheets

SUSPENSION SYSTEM WITH PITCH STIFFNESS CONTROL

INTRODUCTION

The present disclosure is directed to a configurable interconnected suspension system for achieving suspension stiffness.

SUMMARY

The present disclosure is directed to a system for providing configurable stiffness of a suspension system. In some embodiments, the system includes a plurality of hydraulic cylinders, one or more valve assemblies, and a plurality of accumulators. The plurality of hydraulic cylinders, which can be synchronous or non-synchronous, each correspond to a respective wheel of a vehicle. The valve assembly is configured for controlling hydraulic fluid in the plurality of hydraulic cylinders to achieve a plurality of suspension modes affecting bounce, pitch, roll, and warp. The valve assemblies can be controlled to manage pitch stiffness of the vehicle in response to detected conditions, such as longitudinal and lateral dynamics, with overrides in response to vertical acceleration and/or damper displacement. Accordingly, the ability to vary between multiple suspension modes allows the suspension system to provide handling and ride characteristics that are optimized for one or more detectable conditions.

In some embodiments, a system can include a plurality of (e.g., a set of) shock absorbers, which can optionally be provided as hydraulic cylinders, each hydraulic cylinder of the plurality of the hydraulic cylinders being a double-acting hydraulic cylinder having a compression volume and a rebound volume. In some embodiments, each compression volume of the plurality of hydraulic cylinders is coupled to a rebound volume of another hydraulic cylinder via a respective fluid path, and to first and second control valves. In some embodiments, a system includes a plurality of accumulators arranged along each respective fluid path for storing hydraulic fluid flowing along the respective fluid path (e.g., between compression and rebound volumes).

In some embodiments, a method and/or semiconductor device is provided for managing a suspension system of a vehicle based on torque demand. The method can include obtaining, by a processor, sensor data from at least one sensor of the vehicle, the sensor data indicating a torque demand and a longitudinal acceleration of the vehicle. The method can further include determining, based on the sensor data, a suspension mode for the vehicle. The method can further include transmitting, using control circuitry, a control signal for achieving the suspension mode to a control valve that is operable to fluidly connect each of multiple hydraulic lines to each other, the multiple hydraulic lines being fluidly connected to multiple shock absorbers of the vehicle.

In some embodiments, a method and/or semiconductor device is provided for managing a suspension system of a vehicle based on vertical acceleration of the vehicle. The method can include obtaining, by a processor, sensor data from at least one sensor of the vehicle, the sensor data indicating a vertical acceleration of the vehicle. The method can further include, based on the sensor data, determining a suspension mode for the vehicle. The method can further include transmitting, using control circuitry, a control signal for achieving the suspension mode to a control valve that is operable to fluidly connect each of multiple hydraulic lines to each other, the multiple hydraulic lines being fluidly connected to multiple shock absorbers of the vehicle.

In some embodiments, a method and/or semiconductor device is provided for managing a suspension system of a vehicle based on damper displacement of at least one of multiple shock absorbers of the vehicle. The method can include obtaining sensor data from at least one sensor of the vehicle, the sensor data indicating a damper displacement of at least one of multiple shock absorbers of the vehicle. The method can further include, based on the sensor data, determining, based on the sensor data, a suspension mode for the vehicle. The method can further include transmitting a control signal for achieving the suspension mode to a control valve that is operable to fluidly connect each of multiple hydraulic lines to each other, the multiple hydraulic lines being fluidly connected to the multiple shock absorbers.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

The present disclosure is directed to a configurable interconnected suspension system. For example, double-acting hydraulic cylinders can deliver advantages in interconnected arrangements to control pitch stiffness, damping characteristics, and other performance aspects. The present disclosure is directed to a system for providing configurable stiffness characteristics. In some embodiments, the system includes a plurality of hydraulic cylinders, one or more valve assemblies, and a plurality of accumulators. Each of the hydraulic cylinders can correspond to a respective wheel of a vehicle. The valve assembly is configured for controlling hydraulic fluid in the plurality of hydraulic cylinders to achieve a plurality of suspension modes affecting bounce, pitch, roll, and warp. The valve assemblies can be controlled to manage pitch stiffness of the vehicle in response to detected conditions, such as longitudinal and lateral dynamics, with overrides in response to vertical acceleration and/or damper displacement. Accordingly, the handling improvement provided by varying suspension modes is balanced with a desire to provide improved ride characteristics.

Ride characteristics of the vehicle can refer to the comfort of the driver and passengers inside the vehicle. It can be desirable to provide ride characteristics that dampen most or all surface irregularity and provide a smooth and comfortable ride. Handling characteristics can refer to how well the vehicle handles the road (straight or curved; dry, snow or wet; slow or fast) and how well the vehicle responds to steering input. For example, the handling can determine whether the vehicle experiences oversteer (e.g., the vehicle steers more than the driver's input) or understeer (e.g., the vehicle steers less than the driver's input). Often, ride characteristics and handling characteristics are in conflict, in that improving one may diminish the other. It can be desirable to provide an adaptive system that provides enhanced ride characteristics and handling characteristics based on detected conditions.

Figure 1:
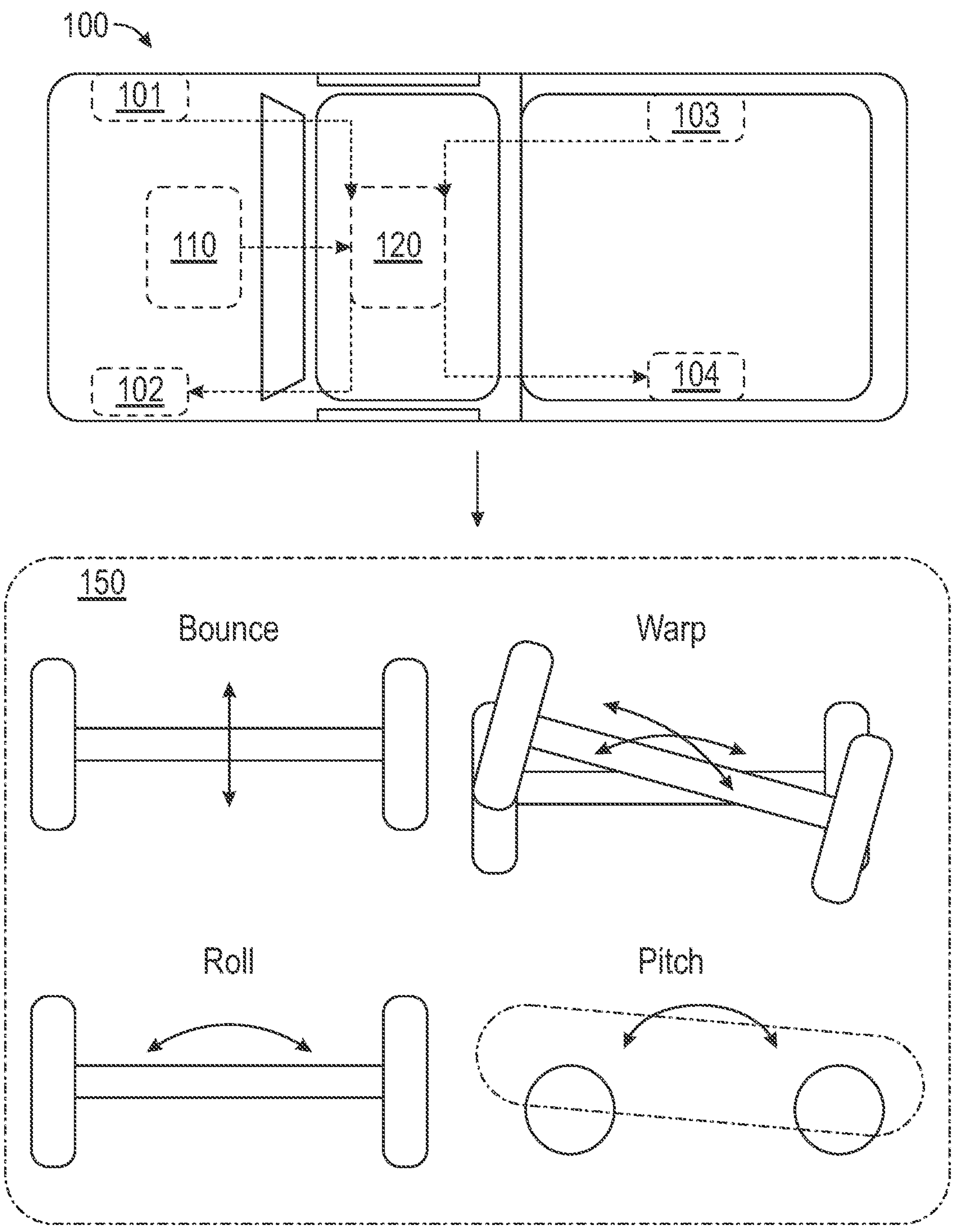
FIG. 1 shows a top view of an illustrative vehicle having a suspension system, in accordance with implementations of the subject technology.

FIG. 1 shows a top view of illustrative vehicle 100 having a suspension system, in accordance with some embodiments of the present disclosure. As illustrated, vehicle 100 includes four wheels, each having corresponding suspensions components (shown collectively as components 101, 102, 103, and 104 for each respective wheel). The suspension components can include springs, struts, hydraulic cylinders, accumulators, control arms (e.g., wishbones), fittings, valves (e.g., control valves, restriction valves, directional valves, or any other suitable valves), fluid conduits, any other suitable components, or any combination thereof. In some embodiments, any or all of components 101, 102, 103, and 104 can include a double-acting hydraulic cylinder, which can be synchronous or non-synchronous. Fluid management module 120 is configured to control fluid flow, pressure, or both among components 101, 102, 103, and 104 to affect suspension performance of vehicle 100. Fluid management module 120 can include, for example, fittings, valves (e.g., control valves, restriction valves, directional valves, or any other suitable valves), accumulators, fluid conduits, control valves (e.g., having controllable actuators), valve blocks (e.g., collections of more than one valve or flow paths), control circuitry (e.g., for processing control signals, generating control signals for valves, receiving sensor signals, or a combination thereof), any other suitable components, or any combination thereof. Control system 110 is configured to manage, monitor, or otherwise control the suspension performance of vehicle 100. In some embodiments, control system 110 is included as part of a central vehicle processing unit. In some embodiments, control system 110 is a separate module communicatively coupled to other processing equipment or controllers (e.g., to control circuitry of fluid management module 120).

In an illustrative example, a vehicle (e.g., vehicle 100) can include a suspension controller (e.g., control system 110) coupled to one or more control valves (e.g., of fluid management module 120) to control stiffness or other aspects of components 101, 102, 103, and 104. In some embodiments, for example, components 101, 102, 103, and 104 each include a double-acting hydraulic cylinder. The double-acting hydraulic cylinders can be coupled by fluid conduits to each other and to fluid management module 120. For example, the compression volumes and rebound volumes of each double-acting hydraulic cylinder can be coupled in any suitable arrangement to each other and/or to components of fluid management module 120. To illustrate, fluid management module 120 can include control valves each having two or more ports (e.g., at least one inlet port and at least one outlet port) that are configured to control the flow of hydraulic fluid among components 101, 102, 103, and 104. Panel 150 shows illustrations of vehicle motion modes including bounce (e.g., body moves up/down relative to both wheel axes together), warp (e.g., vehicle exhibits differing side-side rotation among wheel axes), roll (e.g., vehicle exhibits same side-side rotation for both wheel axes), and pitch (e.g., vehicle exhibits differing bounce motion among wheel axes), which can be achieved by vehicle 100 (e.g., based on motion of front and rear wheel axes).

The term "coupled" as used herein in for flow components (e.g., valves, valve assemblies, valve blocks, accumulators, hydraulic cylinders, and hydraulic conduits) refers to "fluidly coupled" wherein the coupled components are in fluid communication via a fluid that can flow dependent upon pressure differences (e.g., caused by changes in volume), flow path, open area (e.g., of a valve), valve state (e.g., open/close, on/off), or a combination thereof. For example, one or more components can be arranged between or otherwise intermediate to fluid components that are coupled (e.g., coupling can include a direct or indirect fluid connection). To illustrate, a hydraulic cylinder and a control valve can be coupled, with one or more damping valves arranged in the flow path between the hydraulic cylinder and the control valve. A "fluid path" (or "flow path") refers to the trajectory along which a fluid flows (e.g., from one component to the next component, or among a series of components), which can include one or more streams (e.g., parallel or otherwise separate paths). For example, a fluid path can branch (e.g., a stream of fluid separating into two or more parallel streams) or combine (e.g., streams of fluid converging together into a single stream), and can pass through one or more components (e.g., flow through devices such as flow valves or "dampers"), terminate at one or more components (e.g., in a dead-end such as a hydraulic cylinder or accumulator), or a combination thereof (e.g., fill and relieve an accumulator arranged along a fluid path (e.g., defined by a fluid conduit, fittings, or a combination or connections thereof).

Figure 2:
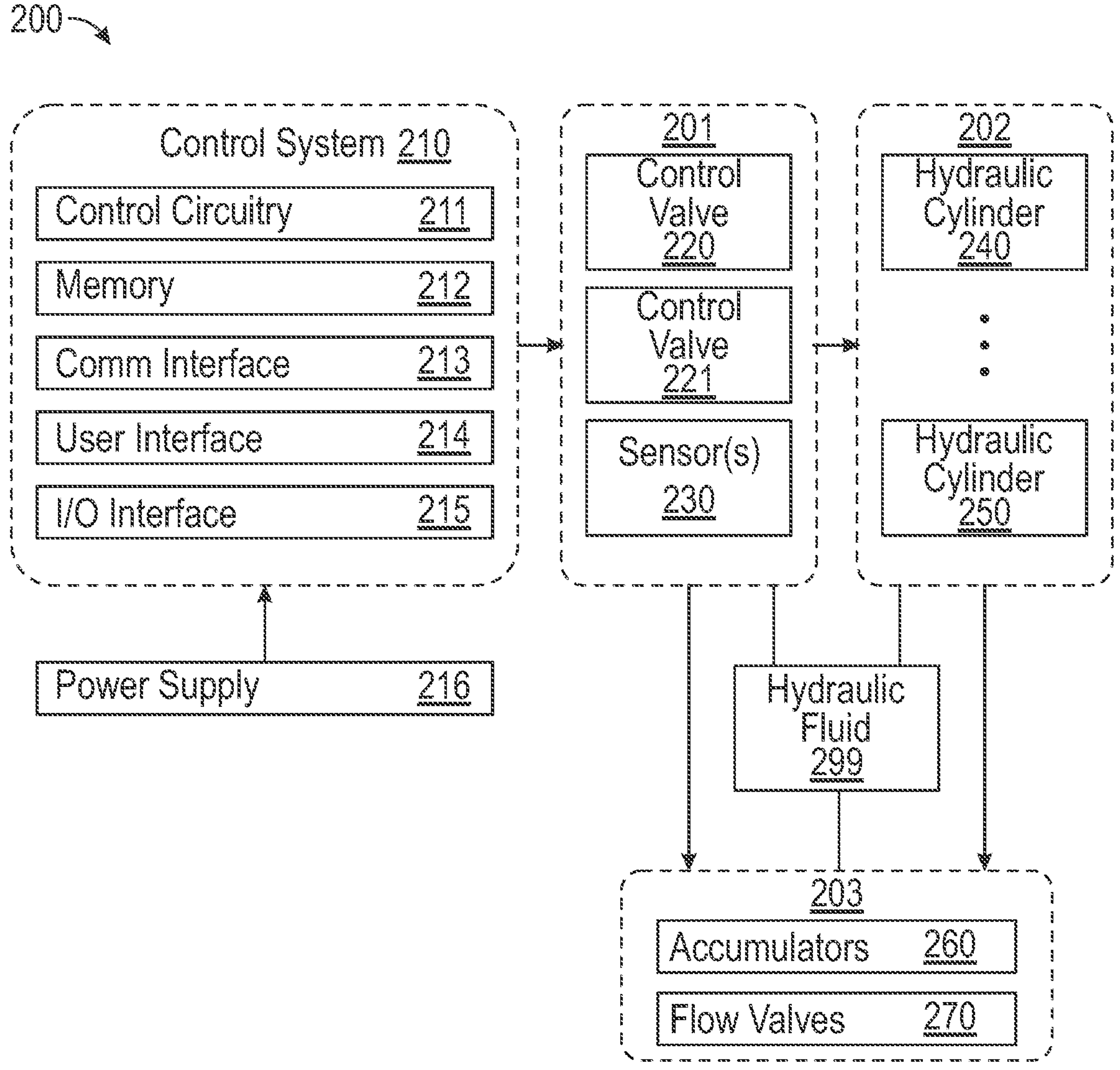
FIG. 2 shows a block diagram of an illustrative control system for controlling a suspension system of a vehicle, in accordance with implementations of the subject technology.

FIG. 2 shows a block diagram of illustrative control system 210 for controlling a suspension system of vehicle 200, in accordance with some embodiments of the present disclosure. To illustrate, vehicle 200 includes components that are not illustrated in FIG. 2. To illustrate further, vehicle 200 can be, but need not be, the same as vehicle 100 of FIG. 1. As illustrated, vehicle 200 includes control system 210, fluid system 201, shock absorbers 202 (e.g., of which hydraulic cylinder 240 is one, and hydraulic cylinder 250 is one), and fluid components 203. As illustrated, control system 210 includes control circuitry 211, memory 212, communications interface 213 (COMM), user input interface 214, and input/output interface 215 (I/O). Illustrative control circuitry 211 can include one or more processors, one or more relays, a communications bus, memory, any other suitable components, or any combination thereof. Hydraulic fluid 299, or any other suitable fluid, is stored in, and flows among, fluid system 201, shock absorbers 202, and fluid components 203.

Control system 210 can include hardware, software, or both, implemented on one or more modules configured to provide control of a suspension system (e.g., fluid system 201, shock absorbers 202, and fluid components 203). In some embodiments, control circuitry 211 includes one or more processors, which can include one or more microprocessors, microcontrollers, digital signal processors, programmable logic devices, field-programmable gate arrays (FPGAs), application-specific integrated circuits (ASICs), or any suitable combination thereof. In some embodiments, control circuitry 211 includes a processor that is distributed across more than one processor or processing units. In some embodiments, control circuitry 211 executes instructions stored in memory 212 (e.g., non-transitory computer readable memory) for managing a suspension system (e.g., fluid system 201, shock absorbers 202, and fluid components 203) of a vehicle (e.g., vehicle 200). In some embodiments, memory 212 is an electronic storage device that is part of control circuitry 211. For example, memory 212 can be configured to store electronic data, computer instructions, applications, firmware, or any other suitable information. In some embodiments, memory 212 includes random-access memory, read-only memory, hard drives, optical drives, solid state devices, or any other suitable memory storage devices, or any combination thereof. For example, memory 212 can be used to launch a start-up routine.

In some embodiments, control system 210 is powered by power supply 216. For example, power can be provided directly or indirectly from power supply 216 to components of fluid system 201 and fluid components 203 (e.g., via control signals, or electric power leads of a relay controlled by control signals). In some embodiments, power supply 216 includes a car battery (e.g., a 12 V lead acid battery, a Li-ion battery, a battery pack of an electric vehicle, or any other suitable battery), a DC-DC converter, an AC power supply (e.g., generated by suitably inverting a DC power supply), any other power supply, any corresponding components (e.g., terminals, switches, fuses, and cables), or any combination thereof.

Communications interface 213 (COMM) is configured to send and receive communications signals from other devices, other controllers, or a combination thereof. In some embodiments, COMM 213 can include one or more antennas, signal processors, ports, plugs, connectors, cables, wires, input/output (I/O) terminals, a printed circuit board, control circuitry, any other suitable components, or any combination thereof. In some embodiments, COMM 213 is configured to receive signals from a smart phone, laptop, tablet, computer, key fob, any other suitable mobile or user device, or any combination thereof.

In some embodiments, user interface 214 includes a push button, a toggle switch, a turnable knob, a display screen (e.g., a touch screen), a key fob, a key-lock combination, a user device (e.g., via COMM 213), any other suitable system or component for receiving input from a user or providing output to a user, or any combination thereof. In some embodiments, user interface 214 includes a touchscreen on the dash of a vehicle, configured to receive input from the user (e.g., to soft buttons or other selectable or adjustable icons or images on a display), and provide a display to the user. In some embodiments, user interface 214 includes one or more buttons that are selectable by a user. For example, the one or more buttons can include a button coupled to a switch, a button on a touchpad, any other suitable button that can be used by a user to make a selection, or any combination thereof. In some embodiments, user interface 214 includes one or more turnable knobs that a user can turn to adjust a suspension system setting and/or mode. In some embodiments, one or more soft buttons (e.g., of a touchscreen) can correspond to a particular function associated with the vehicle, the suspension, or both. For example, a user can interact with user interface 214 to select a suspension mode, control a controllable valve, or otherwise manage suspension system behavior.

In some embodiments, I/O 214 includes a signal generator, signal processor, output terminals, input terminals, any other suitable components, or any combination thereof. For example, I/O 214 can include an amplifier, filter (e.g., digital or analog), power conditioning circuitry (e.g., bypass capacitors or other circuitry), electrical terminals (e.g., for digital signals, analog signals, or both), power terminals (e.g., ground, 3.3V, 5V, 12V, other voltage), any other suitable components, or any combination thereof.

Fluid system 201 can include one or more control valves (e.g., control valves 220 and 221), valve blocks, sensors (e.g., sensors 230), fluid conduits, fittings, any other suitable components, or any combination thereof. In some embodiments, as illustrated, fluid system 201 includes two control valves 220 and 221, which can each include ports and selectable connections among the ports. For example, each of control valves can be configured to achieve one or more positions or configurations, connecting each port to another port or blocking each port. In some embodiments, fluid system 201 can include a plurality of control valves, which can be optionally arranged in one or more valve blocks. Control valves 220 and 221 can include gate valves, needle valves, metering valves, solenoid valves, butterfly valves, globe valves, ball valves, any other suitable type of valve for controlling flow of a hydraulic fluid, or any combination thereof. In some embodiments, control valves 220 and 221, sensors 230, or a combination thereof are communicatively coupled to control system 210 (e.g., via COMM 213 or I/O interface 215). In some embodiments, fluid system 201 can include control circuitry for controlling control valves 220 and 221, and/or receiving sensor signals from sensors 230. In some embodiments, control valves 220 and 221 each include one or more pressure relief valves each having a respective cracking pressure. For example, the pressure relieve valves can be, but need not be, actively controlled. In a further example, the cracking pressure of the pressure relief valves can be selected (e.g., during design or prior to installation, by selecting a spring), or adjusted (e.g., by control system 210), to achieve a resultant pitch force or other suspension behavior.

In some embodiments, sensor(s) 230 include one or more temperature sensors (e.g., a thermocouple, thermistor, resistance temperature detector, or optical sensor), pressure sensors (e.g., piezo or strain-based transducers), position sensors (e.g., an encoder for valve position or hydraulic cylinder position), flow sensors, any other suitable sensors, or any combination thereof. For example, sensor(s) 230 can be used to measure valve position (e.g., of a control valve), pressure of hydraulic fluid 299 (e.g., in a cylinder, accumulator, conduit, or other component), hydraulic cylinder position (e.g., axial displacement), flow rate of hydraulic fluid 299, or any other suitable value. In a further example, sensor(s) 230 can be used to measure pressure or a difference in pressure of hydraulic fluid 299 (e.g., such as a pressure drop across a valve or other component).

In some embodiments, sensor(s) 230 can include one or more sensors that are operable to detect torque demand and/or a torque rate demand. A torque demand may refer to the amount of currently desired motor output torque, for example based on a driver input and/or control system. A torque rate demand may refer to the rate of change of torque demand over time. For example, the driver can provide an input at an accelerator of the vehicle, and a torque demand can be determined based on the received input. By further example, a control system of the vehicle can autonomously provide a torque demand based on a target navigation parameter. Such a detection can include determining a characteristic of a driver input (e.g., accelerator) and/or a calculated value based on a driver input and/or control system. The detected torque demand can be provided as sensor data and as a basis for one or more other operations of the vehicle, such as operations of one of more systems including shock absorbers.

In some embodiments, sensor(s) 230 can include one or more sensors that are operable to detect longitudinal acceleration of the vehicle. A longitudinal acceleration may refer to the acceleration in a longitudinal (e.g., rear to front) direction of the vehicle, for example along a roll axis of the vehicle. The detected longitudinal acceleration can be provided as sensor data and as a basis for one or more other operation of the vehicle, such as operations of one of more systems including shock absorbers.

In some embodiments, sensor(s) 230 can include one or more sensors that are operable to detect vertical acceleration. A vertical acceleration may refer to the acceleration in a vertical (e.g., bottom to top) direction of the vehicle, for example along a yaw axis of the vehicle. The vertical acceleration can be based on the movement of the chassis relative to the ground, the wheels, and/or another frame of reference. The detected vertical acceleration can be provided as sensor data and as a basis for one or more other operations of the vehicle, such as operations of one of more systems including shock absorbers.

In some embodiments, sensor(s) 230 can include one or more sensors that are operable to detect vehicle speed. A vehicle speed may refer to the speed of travel, which can be in a longitudinal (e.g., rear to front) direction of the vehicle, for example along a roll axis of the vehicle. The detected vehicle speed can be provided as sensor data and as a basis for one or more other operations of the vehicle, such as operations of one of more systems including shock absorbers.

Where the sensor(s) 230 are operable to detect speed and/or acceleration, the sensor(s) 230 can include an inertial measurement unit ("IMU") that provides information regarding a characteristic of the vehicle, such as inertial angles thereof. By further example, sensor(s) 230 can include one or more of an accelerometer, a gyroscope, a magnetometer, a speedometer, a global positioning sensor (e.g., satellite-based positioning components), a tilt sensor, and the like.

In some embodiments, sensor(s) 230 can include one or more sensors that are operable to detect damper displacement. A damper displacement may refer to the amount of relative displacement and/or travel of two components of a shock absorber. For example, a piston and move within and/or with respect to a chamber in which it resides. The extent of displacement and/or travel of the piston can be limited by the features of the chamber and/or other features of the system. The detected damper displacement can be provided as sensor data and as a basis for one or more other operations of the vehicle, such as operations of one of more systems including shock absorbers.

Fluid components 203 are configured to affect hydraulic fluid properties and behavior of the suspension system. As illustrated, fluid components 203 include one or more accumulators 260 and one or more flow valves 270. It will be understood that fluid components 203 can include additional components, be integrated into fluid system 201, or otherwise be modified from that illustrated in FIG. 2, in accordance with the present disclosure. Accumulators 260 are configured to store hydraulic fluid 299 at a predetermined or otherwise limited pressure. For example, accumulators 260 can include bladders, pistons, springs, seals, or other components to exert a known pressure (e.g., which may depend on displacement or can be controlled) on hydraulic fluid 299 in the suspension system, thus allowing expansion and contraction of the working fluid volume (e.g., in shock absorbers 202). To illustrate, each of accumulators 260 can include a sealed volume of gas (e.g., air or nitrogen) separated from the hydraulic fluid 299 by a piston, seal, or diaphragm, and undergo compression and expansion based on the pressure of hydraulic fluid 299 in the respective accumulator. Flow valves 270 can include flow restrictions, which can be fixed, adjustable or controllable. For example, each of flow valves 270 can include a throttle, orifice, or other suitable narrowed passage imparting resistance to flow of hydraulic fluid 299. In some examples, any or all of the fluid system 201 and/or any or all of fluid components 203 can be integrated or attached to shock absorbers 202. For example, any of control valves 220 or 221 can be integrated with, or otherwise attached to, any suitable hydraulic cylinder of shock absorbers 202. In a further example, any of flow valves 270, accumulators 260, and control valves 220 and 221 can be integrated with, or otherwise attached to, any suitable hydraulic cylinder of shock absorbers 202.

Figure 3:
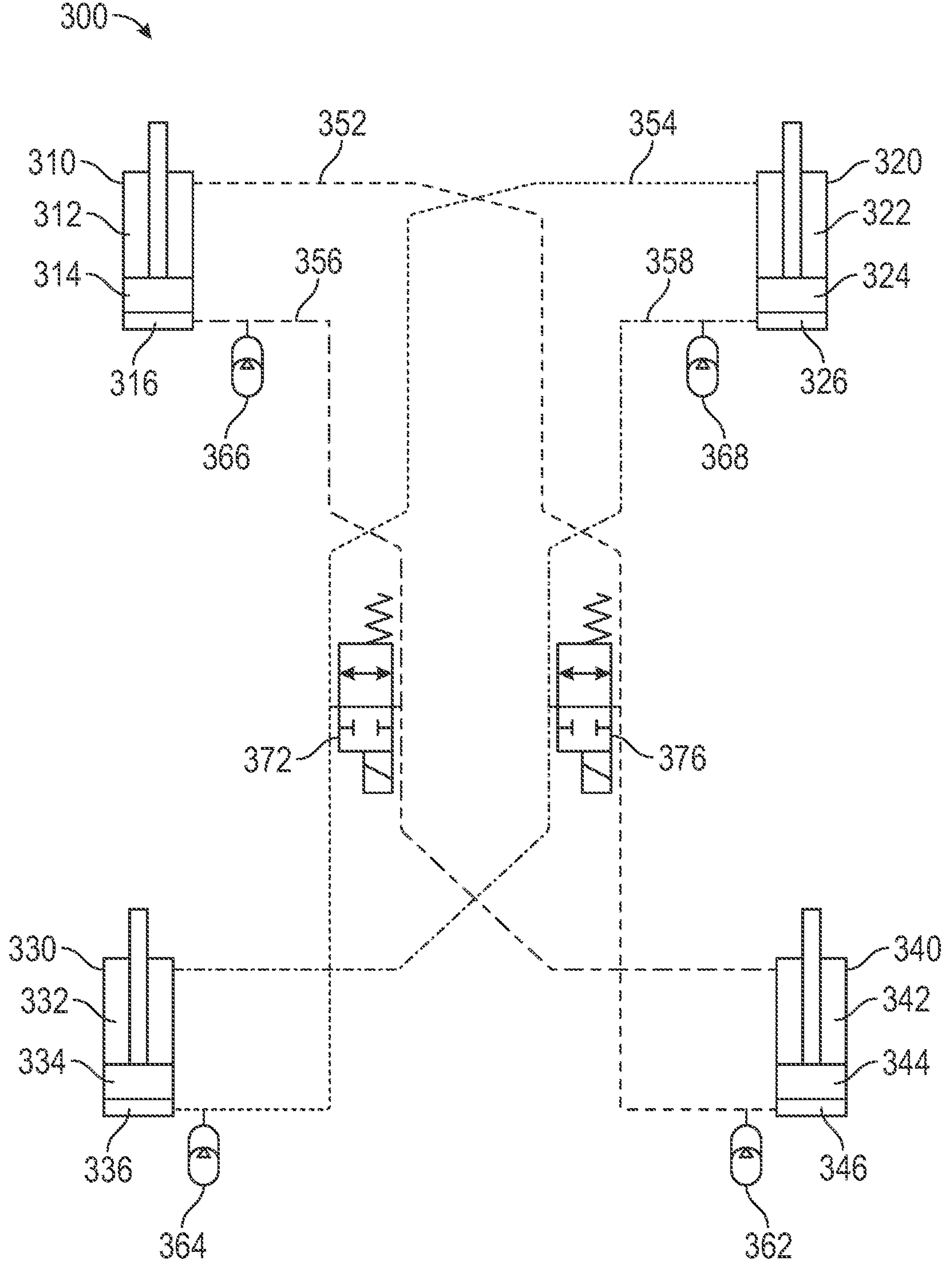
FIG. 3 shows a block diagram of an illustrative vehicle suspension system, in accordance with implementations of the subject technology.

FIG. 3 shows a block diagram of illustrative vehicle suspension system 300, in accordance with some embodiments of the present disclosure. As illustrated, system 300 can include hydraulic lines 352, 354, 356, and 358, shock absorbers 310, 320, 330, and 340, control valves 372 and 376, and accumulators 362, 364, 366, and 368. In some embodiments, system 300 can further include one or more flow valves (e.g., can also be referred to as flow dampers or damping valves), along with any other suitable fluid conduits and fittings to make the fluid connections.

Each of shock absorbers 310, 320, 330, and 340 corresponds to a respective wheel of the vehicle (e.g., front and rear, right and left). For example, each of shock absorbers 310, 320, 330, and 340 can be coupled to a respective suspension linkage (e.g., control arms, a frame element, a Macpherson linkage, trailing arm linkage, or other suitable linkage) which affects displacement and dynamics of the corresponding wheel. Each of shock absorbers 310, 320, 330, and 340 includes a double-acting hydraulic cylinder, which can be synchronous or non-synchronous.

Each of shock absorbers 310, 320, 330, and 340 includes a rebound volume and a compression volume, arranged on either side of a piston. For example, the first shock absorber 310 includes a first rebound volume 312 and a first compression volume 316, arranged on either side of a first piston 314. By further example, the second shock absorber 320 includes a second rebound volume 322 and a second compression volume 326, arranged on either side of a second piston 324. By further example, the third shock absorber 330 includes a third rebound volume 332 and a third compression volume 336, arranged on either side of a third piston 334. By further example, the fourth shock absorber 340 includes a fourth rebound volume 342 and a fourth compression volume 346, arranged on either side of a fourth piston 344.

To the extent that any of shock absorbers 310, 320, 330, and 340 are synchronous, then the change in fluid volume in the rebound and compression volumes are equal and opposite for movement of the piston. To the extent that any of shock absorbers 310, 320, 330, and 340 are non-synchronous, then the change in fluid volume in the rebound and compression volumes are opposite but not equal for movement of the piston. For example, as illustrated in FIG. 3, as a piston moves downwards the compression volume becomes smaller while the rebound volume becomes larger.

The hydraulic lines 352, 354, 356, and 358 can be arranged to fluidly connect any two shock absorbers. Each of the hydraulic lines 352, 354, 356, and 358 can fluidly connect to a rebound volume of one shock absorber and a compression volume of another shock absorber. Each of the hydraulic lines 352, 354, 356, and 358 fluidly connect to a shock absorber on a first lateral side (e.g., left or right) of the system 300 and a shock absorber on a second lateral side (e.g., left or right), opposite the first lateral side, of the system 300. Each of the hydraulic lines 352, 354, 356, and 358 fluidly connect to a shock absorber on a first longitudinal side (e.g., front or rear) of the system 300 and a shock absorber on a second longitudinal side (e.g., front or rear), opposite the first longitudinal side, of the system 300.

For example, the first hydraulic line 352 can fluidly connect the first rebound volume 312 of the first shock absorber 310 to the fourth compression volume 346 of the fourth shock absorber 340. By further example, the second hydraulic line 354 can fluidly connect the second rebound volume 322 of the second shock absorber 320 to the third compression volume 336 of the third shock absorber 330. By further example, the third hydraulic line 356 can fluidly connect the fourth rebound volume 342 of the fourth shock absorber 340 to the first compression volume 316 of the first shock absorber 310. By further example, the fourth hydraulic line 358 can fluidly connect the third rebound volume 332 of the third shock absorber 330 to the second compression volume 326 of the second shock absorber 320.

Accumulators 362, 364, 366, and 368, as illustrated, can be connected to corresponding ones of the hydraulic lines. For example, a first accumulator 362 can be connected to the first hydraulic line 352, a second accumulator 364 can be connected to the second hydraulic line 354, a third accumulator 366 can be connected to the third hydraulic line 356, and/or a fourth accumulator 368 can be connected to the fourth hydraulic line 358. Accumulators 362, 364, 366, and 368 can be gas charged and thus can store varying amounts of hydraulic fluid based on pressure. For example, as the gas is compressed or expanded, the pressure exerted on the hydraulic fluid by the gas changes. In some embodiments, accumulators 362, 364, 366, and 368 can include springs (e.g., in addition to or instead of the gas) to provide stiffness against displacement (e.g., fluid accumulation). In some embodiments, the response of accumulators 362, 364, 366, and 368 can be controlled or otherwise modified during operation (e.g., by adjusting the mass of trapped gas, or adjusting a spring constant).

In some embodiments, one or more flow valves (not shown) can be coupled to each rebound or compression volume of any given one or more of the shock absorbers 310, 320, 330, and 340 and restrict flow of hydraulic fluid in one or more directions (e.g., along a corresponding one of the hydraulic lines). For example, rebound flow valves can restrict flow of hydraulic fluid to and from rebound volumes, while compression flow valves can restrict flow of hydraulic fluid to and from compression volumes. In some embodiments, each of the flow valves can restrict flow in only a single direction, restrict flow in both directions, include two separate flow valves each corresponding to a direction, or any combination thereof. In some embodiments, the flow valves can be integrated into other components (e.g., into corresponding shock absorbers 310, 320, 330, and 340) or omitted.

System 300 provides an illustrative example of a plurality of two-position, two-port valves (e.g., control valves 372 and 376), which can be controlled by a control system (e.g., by receiving control signals at actuators). For example, each of control valves 372 and 376 can be configured to receive control signals from a control system to achieve one of two positions (e.g., both ports blocked, or both ports connected together). In some embodiments, control valves 372 and 376 need not be actively controlled, and can include passive control valves such as, for example, pressure relief valves or other suitable valves having characterized operation (e.g., a cracking pressure, damping, loss coefficient, or other suitable property). For example, each of control valves 372 and 376 can include a pressure relief valve having a spring configured to achieve a cracking pressure. In a further example, each respective spring of control valves 372 and 376 can be selected to result in a corresponding cracking pressure and corresponding opening/closing dynamics.

As shown in FIG. 3, a first control valve 372 can controllably select either (a) fluidly connecting the second hydraulic line 354 to the third hydraulic line 356 or (b) fluidly separating the second hydraulic line 354 from the the third hydraulic line 356. As further shown in FIG. 3, a second control valve 376 can controllably select either (a) fluidly connecting the first hydraulic line 352 to the fourth hydraulic line 358 or (b) fluidly separating the first hydraulic line 352 from the fourth hydraulic line 358. The first control valve 372 and the second control valve 376 can optionally be operated in concert to have the same configuration as each other in one or more of the available modes.

In a first suspension mode (e.g., roll stiffness mode), the first control valve 372 and the second control valve 376 can be open to provide substantial roll stiffness with relatively less pitch stiffness. For example, when open, the first control valve 372 can fluidly interconnect the second rebound volume 322 of the second shock absorber 320, the third compression volume 336 of the third shock absorber 330, the fourth rebound volume 342 of the fourth shock absorber 340, and the first compression volume 316 of the first shock absorber 310. By further example, when open, the second control valve 376 can fluidly interconnect the first rebound volume 312 of the first shock absorber 310, the fourth compression volume 346 of the fourth shock absorber 340, the third rebound volume 332 of the third shock absorber 330, and the second compression volume 326 of the second shock absorber 320. In the first suspension mode, the system 300 can provide relatively lower pitch stiffness. As such, a greater magnitude and/or responsiveness of pitch adjustments are provided (e.g., due to relatively greater pitch stiffness). Such a configuration can be maintained while also limiting the magnitude and/or responsiveness of roll adjustments. With such a mode, ride characteristics can be enhanced.

In a second suspension mode (e.g., roll and pitch stiffness mode), the first control valve 372 and the second control valve 376 can be closed to provide substantial roll stiffness and substantial pitch stiffness. For example, when closed, the second control valve 376 can limit or prevent the fluid connection described above, and the first control valve 372 can limit or prevent the fluid connection described above. In the second suspension mode, the system 300 can provide relatively greater pitch stiffness. As such, the magnitude and/or responsiveness of pitch adjustments are limited (e.g., due to relatively greater pitch stiffness). Such a configuration can be maintained while also limiting the magnitude and/or responsiveness of roll adjustments. With such a mode, handling characteristics can be enhanced.

In some such embodiments, each control valve can optionally be or include a pressure relief valve having a respective opening or cracking pressure that can be regulated by an adjustable spring or a selected spring having predetermined properties (e.g., a spring stiffness). To illustrate, the cracking pressure can affect the maximum pitch force of the suspension system. For example, a relatively lesser cracking pressure may correspond to no pitch force or an otherwise low pitch force, which can be equivalent to or otherwise similar to control valves 372 and/or 376 in a fully open position. In a further example, a relatively greater cracking pressure may correspond to the greatest or otherwise greater pitch force, which can be equivalent to or otherwise similar to control valves 372 and/or 376 in a fully closed position. In some embodiments, the cracking pressure can be adjustable (e.g., mechanically or electronically adjustable), and the relief pressure can be continuously adjusted to adjust the range of maximum pitch forces (e.g., by the user or an automatic control system configured to control aspects of the vehicle suspension system).

In an illustrative example, control valves 372 and 376, accumulators 362, 364, 366, and 368, or a suitable combination thereof can be integrated with, or otherwise attached to, suitable hydraulic cylinders of shock absorbers 310, 320, 330, and 340. In a further example, in some embodiments, accumulators 362, 364, 366, and 368, or a combination thereof can be integrated with, or otherwise attached to, control valves 372 and 376 (e.g., bypass valves). To illustrate, control valves 372 and 376 can be controllable by a suitable control system. In a further example, in some embodiments, control valves 372 and 376, accumulators 362, 364, 366, and 368, and shock absorbers 310, 320, 330, and 340 are separate components coupled by fluid conduits.

Figure 4:
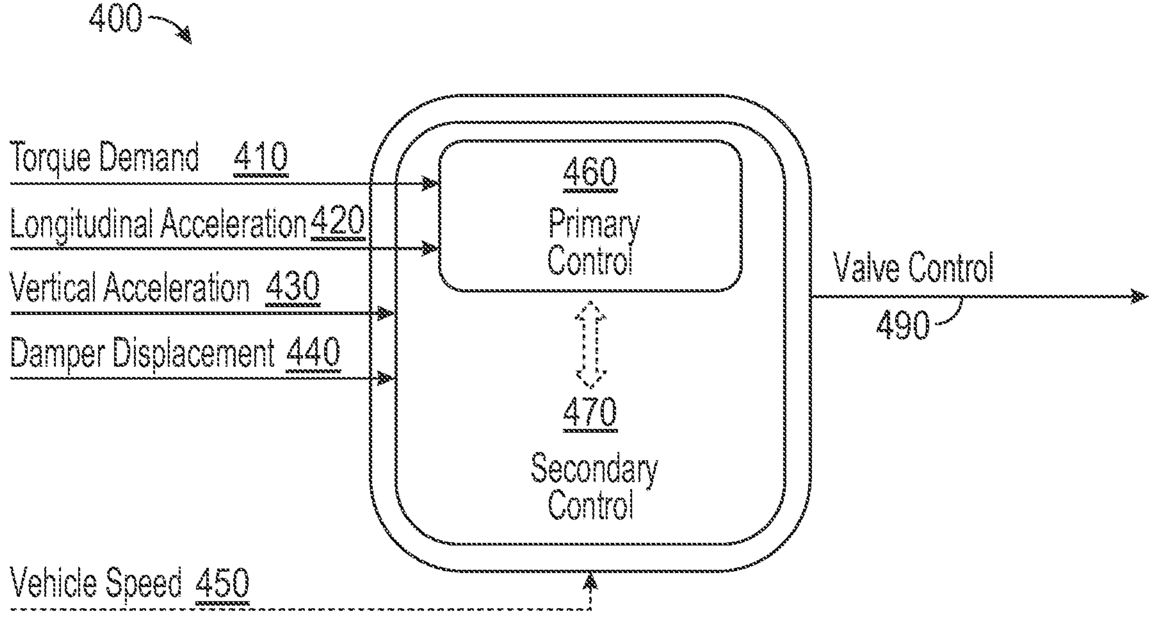
FIG. 4 is a schematic diagram of an illustrative process for managing a suspension system, in accordance with some embodiments of the present disclosure.

Referring now to FIG. 4, a system can select a suspension mode based on one or more detections provided as sensor data. FIG. 4 illustrates an example system 400 for managing a suspension system, in accordance with some embodiments of the present disclosure. For example, the suspension system can include any of the illustrative arrangements of FIGS. 1-3.

In some embodiments, the system 400 can receive one or more inputs as sensor data. The sensor data can indicate one or more corresponding detections. The sensor data can be generated by one or more sensors (e.g., sensors 230) of a vehicle. The sensor data can be received as signals.

In some embodiments, the system 400 can include a primary control subsystem 460. The primary control subsystem 460 can receive one or more inputs and determine a suspension mode of the suspension system. For example, the primary control subsystem 460 can receive a signal 410 comprising an indication of a torque demand and/or torque rate demand. By further example, the primary control subsystem 460 can receive a signal 420 comprising an indication of a longitudinal acceleration of the vehicle. Based on the signal 410 and/or the signal 420, the primary control subsystem 460 can select an appropriate suspension mode. The system 400 can output a corresponding valve control signal 490 to achieve the selected suspension mode.

In some embodiments, the system 400 can include a secondary control subsystem 470. The secondary control subsystem 470 can receive one or more inputs and determine a suspension mode of the suspension system. For example, the secondary control subsystem 470 can receive a signal 430 comprising an indication of a vertical acceleration of the vehicle (e.g., at the chassis). By further example, the secondary control subsystem 470 can receive a signal 440 comprising an indication of a damper displacement of one or more shock absorbers of the vehicle. Based on the signal 430 and/or the signal 440, the primary control subsystem 460 can select an appropriate suspension mode. The system 400 can output a corresponding valve control signal 490 to achieve the selected suspension mode.

In some embodiments, the secondary control subsystem 470 can influence a determination made by the primary control subsystem 460. For example, regardless of the suspension mode determined and selected by the primary control subsystem 460 based on its received inputs, the secondary control subsystem 470 can override such a determination and selection based on the suspension mode that it has determined and selected. In particular, where the signal 430 and/or the signal 440 indicate a detected condition (e.g., vertical acceleration and/or damper displacement) that exceeds a threshold, the secondary control subsystem 470 can prevent the primary control subsystem 460 from acting on any determination and/or selection made based on its received signals 410 and/or 420. Where the signal 430 and/or the signal 440 indicate a detected condition (e.g., vertical acceleration and/or damper displacement) that does not exceed a threshold, the secondary control subsystem 470 can allow the primary control subsystem 460 to act on a determination and/or selection made based on its received signals 410 and/or 420.

It will be understood that, in some embodiments, the secondary control subsystem 470 can optionally be omitted, such that the primary control subsystem 460 acts without override influence from another subsystem. It will be understood that, in some embodiments, the primary control subsystem 460 can optionally be omitted or replaced with another subsystem, such that the secondary control subsystem 470 operates with override influence over another subsystem, such as a subsystem that receives one or more other inputs and/or determines a default suspension mode.

In some embodiments, the primary control subsystem 460 and/or the secondary control subsystem 470 can optionally include one or more other inputs as sensor data. For example, a signal 450 comprising an indication of a vehicle speed can be provided. The signal 450 can influence how other operations are performed. For example, the vehicle speed can influence a threshold against which one or more other detected conditions are compared.

Figure 5:
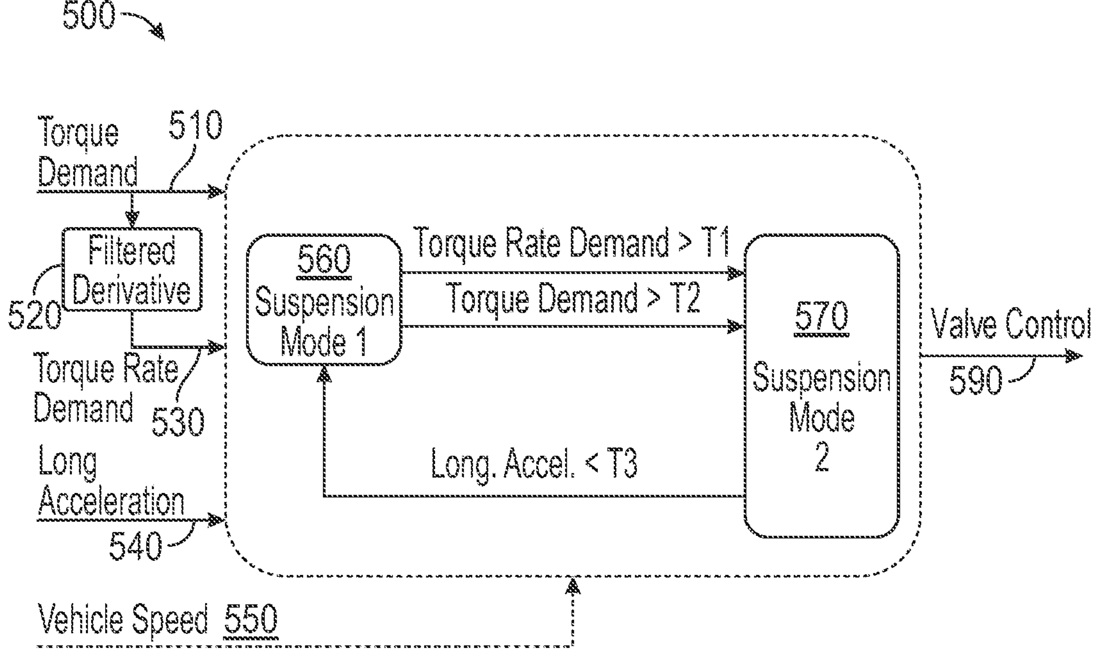
FIG. 5 is a schematic diagram of an illustrative process for managing a suspension system, in accordance with some embodiments of the present disclosure.

Referring now to FIG. 5, a system can select a suspension mode based on one or more detections provided as sensor data. FIG. 5 illustrates an example system 500 for managing a suspension system, in accordance with some embodiments of the present disclosure. For example, the system 500 can be part of and/or include the primary control subsystem 460 shown in FIG. 4.

In some embodiments, the system 500 can receive one or more inputs and determine a suspension mode of the suspension system. For example, the system 500 can receive a signal 510 comprising an indication of a torque demand. By further example, the system 500 can receive or determine a signal 530 comprising an indication of a torque rate demand. In some embodiments, the torque rate demand can be determined from the signal 510 comprising the indication of the torque demand. For example a filtered derivative of the torque demand can be calculated at block 520 to generate the signal 530 comprising the indication of the torque rate demand. By further example, the system 500 can receive a signal 540 comprising an indication of a longitudinal acceleration of the vehicle. By further example, the system 500 can receive a signal 550 comprising an indication of a vehicle speed.

The torque rate demand and/or the torque demand can be compared to a threshold to determine a suspension mode. For example, if the torque rate demand exceeds a first threshold ("T1"), the system 500 can determine and select a second suspension mode at block 570. By further example, if the torque demand exceeds a second threshold ("T2"), the system 500 can determine and select the second suspension mode at block 570. In the second suspension mode (e.g., roll and pitch stiffness mode), control valves (e.g., the first control valve 372 and the second control valve 376) can be closed to provide substantial roll stiffness and substantial pitch stiffness. In the second suspension mode, the suspension system can provide relatively greater pitch stiffness. As such, the magnitude and/or responsiveness of pitch adjustments are limited (e.g., due to relatively greater pitch stiffness). Such a configuration can be maintained while also limiting the magnitude and/or responsiveness of roll adjustments. With such a mode, handling characteristics can be enhanced, which can be desirable when torque demand and/or torque rate demand is high.

In some embodiments, the threshold against which the torque rate demand is compared can be fixed or variable. For example, a torque rate demand threshold (first threshold or "T1") can be calculated based on the vehicle speed. In some embodiments, the torque rate demand threshold can be inversely proportional to the vehicle speed, such that the torque rate demand threshold is higher when the vehicle speed is lower and lower when the vehicle speed is higher. Accordingly, at higher vehicle speeds, a particular torque rate demand may be required to determine whether to allow or prevent the second suspension mode. It will be understood that any one or more of a variety of formulas (e.g., linear, logarithmic, exponential, stepwise, etc.) can be applied to calculate the torque rate demand threshold. In some embodiments, the torque rate demand threshold can be retrieved from a lookup table that correlates vehicle speeds and/or ranges thereof with torque rate demand thresholds and/or ranges thereof. The amount of extension provided while in the second mode can be greater when the torque rate demand threshold is higher. The amount of extension provided while in the second mode can be smaller when the torque rate demand threshold is lower.

In some embodiments, the threshold against which the torque demand is compared can be fixed or variable. For example, a torque demand threshold (first threshold or "T2") can be calculated based on the vehicle speed. In some embodiments, the torque demand threshold can be inversely proportional to the vehicle speed, such that the torque demand threshold is higher when the vehicle speed is lower and lower when the vehicle speed is higher. Accordingly, at higher vehicle speeds, a particular torque demand may be required to determine whether to allow or prevent the second suspension mode. It will be understood that any one or more of a variety of formulas (e.g., linear, logarithmic, exponential, stepwise, etc.) can be applied to calculate the torque demand threshold. In some embodiments, the torque demand threshold can be retrieved from a lookup table that correlates vehicle speeds and/or ranges thereof with torque demand thresholds and/or ranges thereof. The amount of extension provided while in the second mode can be greater when the torque demand threshold is higher. The amount of extension provided while in the second mode can be smaller when the torque demand threshold is lower.

In some examples, the second mode can be engaged when the vehicle is rolling into a certain speed with relatively little torque rate demand and/or torque demand. Accordingly, the magnitude of vehicle pitch angle per unit of longitudinal acceleration (e.g., pitch gradient) can be varied with vehicle speed, torque rate demand, and/or torque demand.

In some embodiments, either the first threshold ("T1") or the second threshold ("T2") can be sufficient to determine and select the second suspension mode. For example, in some embodiments, the second suspension mode can be selected based on torque demand and/or torque rate demand regardless of other conditions (e.g., longitudinal acceleration). In some embodiments, one or more other criteria can be sufficient to determine and select the second suspension mode. In some embodiments, both the first threshold ("T1") and the second threshold ("T2") must be satisfied to determine and select the second suspension mode. In some embodiments, one or more other criteria must be satisfied to determine and select the second suspension mode. For example, in some embodiments, the second suspension mode may only be selected based on torque demand and/or torque rate demand if one or more other conditions (e.g., longitudinal acceleration) do not exceed a threshold.

The longitudinal acceleration of the vehicle can be compared to a threshold to determine a suspension mode. For example, if the longitudinal acceleration is lower than a third threshold ("T3"), the system 500 can determine and select a first suspension mode at block 560. In the first suspension mode (e.g., roll stiffness mode), control valves (e.g., the first control valve 372 and the second control valve 376) can be open to provide substantial roll stiffness with relatively less pitch stiffness. In the first suspension mode, the suspension system can provide relatively lower pitch stiffness. As such, a greater magnitude and/or responsiveness of pitch adjustments are provided (e.g., due to relatively greater pitch stiffness). Such a configuration can be maintained while also limiting the magnitude and/or responsiveness of roll adjustments. With such a mode, ride characteristics can be enhanced, which can be desirable when longitudinal acceleration is low (e.g., indicating that handling may be a lower priority).

In some embodiments, either the third threshold ("T3") can be sufficient to determine and select the first suspension mode. For example, in some embodiments, the first suspension mode can be selected based on longitudinal acceleration regardless of other conditions (e.g., torque demand and/or torque rate demand). In some embodiments, one or more other criteria can be sufficient to determine and select the first suspension mode. In some embodiments, the third threshold ("T3") must be satisfied to determine and select the first suspension mode. In some embodiments, one or more other criteria must be satisfied to determine and select the first suspension mode. For example, in some embodiments, the first suspension mode may only be selected based on longitudinal acceleration if one or more other conditions (e.g., torque demand and/or torque rate demand) do not exceed a threshold.

Based on the signal 410 and/or the signal 420, the primary control subsystem 460 can select an appropriate suspension mode. The system 400 can output a corresponding valve control signal 490 to achieve the selected suspension mode.

Figure 6:
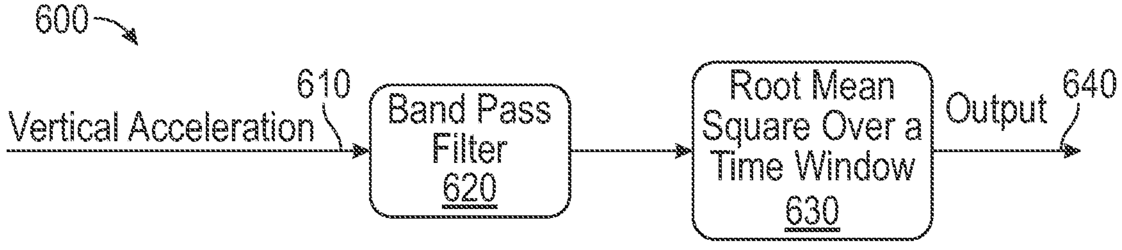
FIG. 6 is a schematic diagram of an illustrative process for managing a suspension system, in accordance with some embodiments of the present disclosure.

Referring now to FIG. 6, a system can select a suspension mode based on one or more detections provided as sensor data. FIG. 6 illustrates an example system 600 for managing a suspension system based on vertical acceleration of the vehicle, in accordance with some embodiments of the present disclosure. For example, the system 600 can be part of and/or include the secondary control subsystem 470 shown in FIG. 4.

As shown in FIG. 6, the system 600 can receive a signal 610 comprising an indication of a vertical acceleration of the vehicle (e.g., at the chassis). The system 600 can perform one or more operations to process the signal 610. In some embodiments, at block 620, the system 600 can process the signal 610 with a band pass filter. For example, the system 600 can allow signals within a selected range of frequencies to be a basis for further operations, while preventing signals at unwanted frequencies from getting through. In some embodiments, at block 630, the system 600 can process the signal 610 (e.g., the results of block 620) with a root mean square over a time window. For example, the system 600 can calculate a root mean square according to the formula:

$$\mathrm{RMS} = \frac{1}{N}\sum_{1}^{N} a_{zFILT} N$$

Based on the signal 610 and/or processing steps performed thereon, the system 600 can output a signal 640. For example, the root mean square result of block 630 can be provided for comparison to a threshold. If the value is above a threshold, the second suspension mode can be prevented (e.g., for a span of time and/or until the value changes). If the value is below a threshold, the second suspension mode can be allowed (e.g., optionally subject to one or more other conditions). The system 600 can then determine a corresponding valve control signal to achieve the selected suspension mode.

In some embodiments, the threshold against which the vertical acceleration is compared can be fixed or variable. For example, a vertical acceleration threshold can be calculated based on the vehicle speed. In some embodiments, the vertical acceleration threshold can be directly proportional to the vehicle speed, such that the vertical acceleration threshold is higher when the vehicle speed is higher and lower when the vehicle speed is lower. Accordingly, at higher vehicle speeds, a vertical acceleration may be required to determine whether to allow or prevent the second suspension mode. It will be understood that any one or more of a variety of formulas (e.g., linear, logarithmic, exponential, stepwise, etc.) can be applied to calculate the vertical acceleration threshold.

Figure 7:
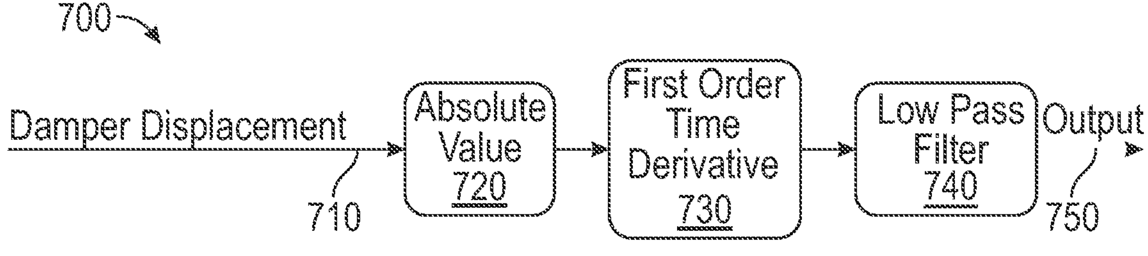
FIG. 7 is a schematic diagram of an illustrative process for managing a suspension system, in accordance with some embodiments of the present disclosure.

Referring now to FIG. 7, a system can select a suspension mode based on one or more detections provided as sensor data. FIG. 7 illustrates an example system 700 for managing a suspension system based on damper displacement of the vehicle, in accordance with some embodiments of the present disclosure. For example, the system 700 can be part of and/or include the secondary control subsystem 470 shown in FIG. 4.

As shown in FIG. 7, the system 700 can receive a signal 710 comprising an indication of a damper displacement of the vehicle (e.g., at one or more shock absorbers). The system 700 can perform one or more operations to process the signal 710. In some embodiments, at block 720, the system 700 can process the signal 710 to determine an absolute value thereof. In some embodiments, at block 730, the system 700 can process the signal 710 (e.g., the results of block 720) with a first order time derivative. In some embodiments, at block 740, the system 700 can process the signal 710 (e.g., the results of block 730) with a low pass filter (e.g., at any given value, such as 20 Hz). For example, the system 700 can process the signal 710 according to the formula:

$$\left|\frac{dz_{FR}}{dt}\right| \vee \left|\frac{dz_{FR}}{dt}\right|$$

Based on the signal 710 and/or processing steps performed thereon, the system 700 can output a signal 750. For example, the value and/or result of block 740 can be provided for comparison to a threshold. If the value is above a threshold, the second suspension mode can be prevented (e.g., for a span of time and/or until the value changes). If the value is below a threshold, the second suspension mode can be allowed (e.g., optionally subject to one or more other conditions). The system 700 can then determine a corresponding valve control signal to achieve the selected suspension mode.

In some embodiments, the threshold against which the damper displacement is compared can be fixed or variable. For example, a damper displacement threshold can be calculated based on the vehicle speed. In some embodiments, the damper displacement threshold can be directly proportional to the vehicle speed, such that the damper displacement threshold is higher when the vehicle speed is higher and lower when the vehicle speed is lower. Accordingly, at higher vehicle speeds, a damper displacement may be required to determine whether to allow or prevent the second suspension mode. It will be understood that any one or more of a variety of formulas (e.g., linear, logarithmic, exponential, stepwise, etc.) can be applied to calculate the damper displacement threshold.

Figure 8:
FIG. 8 is a flow chart of an illustrative process for managing a suspension system, in accordance with some embodiments of the present disclosure.
Figure 8:
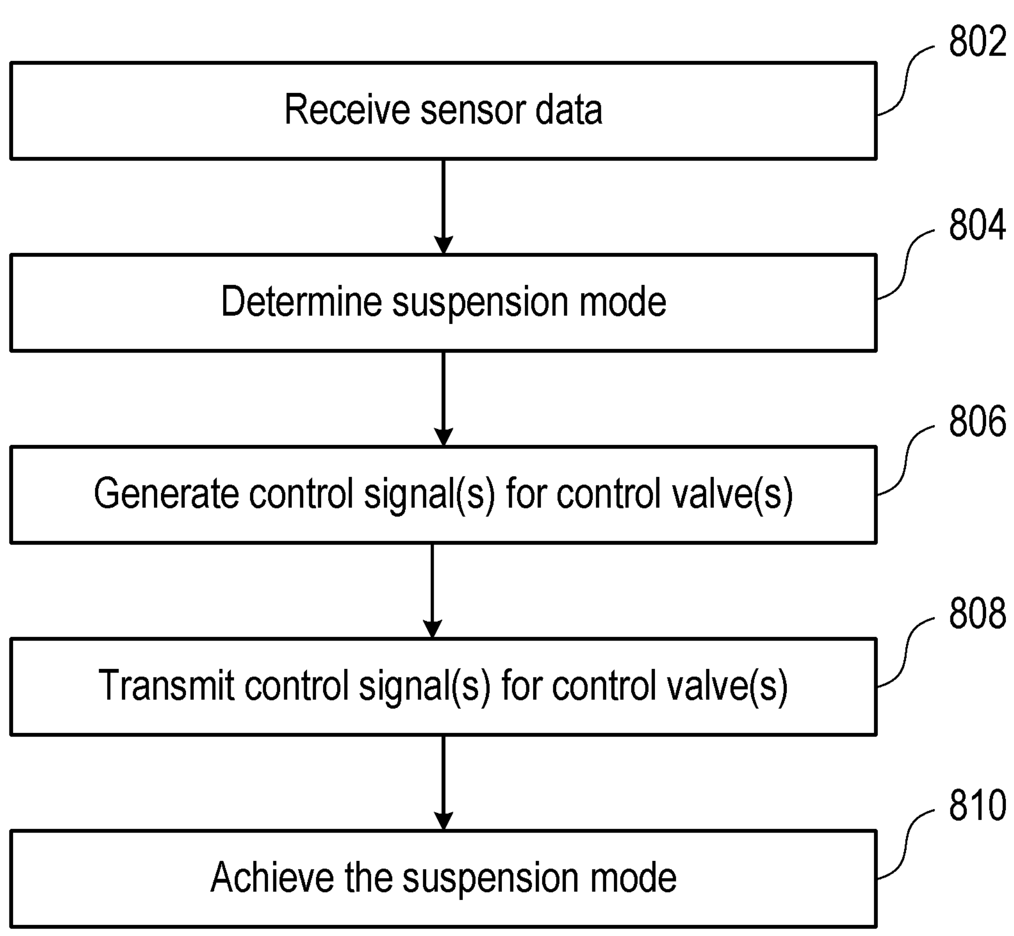

FIG. 8 illustrates a flow diagram of an example process 800 for managing suspension modes based on sensor data in accordance with one or more implementations of the subject technology. For explanatory purposes, the process 800 is primarily described herein with reference to the vehicles and/or systems described herein and/or various components thereof. However, one or more blocks (or operations) of the process 800 may be performed by one or more other structural components and/or of other suitable moveable apparatuses, devices, or systems. Further, for explanatory purposes, some of the blocks of the process 800 are described herein as occurring in serial, or linearly. However, multiple blocks of the process 800 may occur in parallel. In addition, the blocks of the process 800 need not be performed in the order shown and/or one or more blocks of the process 800 need not be performed and/or can be replaced by other operations. In some embodiments, instructions for implementing process 800 for managing a suspension system are stored in memory (e.g., non-transitory computer readable memory such as memory 212) and executed by control circuitry (e.g., control circuitry 211).

At block 802, the system may, by a processor (e.g., the control circuitry 211), receive sensor data. For example, the system can receive an indication to change suspension modes. In some embodiments, the system receives sensor data as one or more sensor signals at block 802 from one or more sensors configured to sense suspension behavior, vehicle dynamics, and the like. Block 802 can include receiving an input at an input interface. The input can include suspension information, such as user input (e.g., at a user input interface), sensor information (e.g., based on one or more sensor signals), reference information (e.g., retrieved from a database), any other suitable input, or any combination thereof.

At block 804, the system may, by a processor (e.g., the control circuitry 211), determine a suspension mode. In some embodiments, the system determines the suspension mode at block 804 based at least in part on sensor data received at block 802. In some embodiments, determining the suspension mode for the vehicle at block 804 includes selecting the suspension mode from among a plurality of suspension modes (e.g., based on a combination of valve configurations). Blocks 802 and/or 804 can be performed at any suitable interval (e.g., a random interval, or at a predetermined frequency), in response to any suitable event, as part of any suitable algorithm or set of executable instructions, or any combination thereof.

At block 806, the system may, by a processor (e.g., the control circuitry 211), generate one or more control signals for one or more control valves. In some embodiments, for example, the system can include one or more valves, valve assemblies, valve blocks, or a combination thereof, and the system can generate a respective control signal corresponding to each valve, valve assembly, or valve block. In some embodiments, the system generates the one or more control signals based on the suspension mode of block 806. In some embodiments, the system includes a signal generator, communications bus, communications interface, or any other suitable components for generating a software signal, electrical signal, optical signal, wireless signal, any other suitable signal, or any combination thereof.

At block 808, the system may, by a processor (e.g., the control circuitry 211), transmit the one or more control signals of block 806 to the one or more valves, valve blocks, or otherwise actuators for controlling characteristics of the suspension system. In some embodiments, block 808 includes (i) transmitting (e.g., using control circuitry 211) a first control signal for achieving the suspension mode to a first control valve fluidly coupled to one or more shock absorbers (e.g., four shock absorbers), and (ii) transmitting (e.g., using control circuitry 211) a second control signal for achieving the suspension mode to a second control valve fluidly coupled to one or more shock absorbers (e.g., the four shock absorbers). In some embodiments, the system generates a signal control system that is multiplexed, split, or otherwise transmitted to two or more separate valves, valve assemblies, or valve blocks. The one or more control signals can be transmitted over a cable (e.g., a multiconductor cable), a communications bus, one or more wires, one or more fiber optics, one or more wireless signals (e.g., transmitted and received by antennas), any other suitable communications link, or any combination thereof.

At block 810, the system may, by a processor (e.g., the control circuitry 211), achieve the suspension mode determined at block 804. Each suspension mode can include adjusting, specifying, or otherwise achieving a stiffness to bounce, pitch, roll, warp, or other motions by controlling the one or more valves and/or valve bodies. Each suspension mode can include prescribed stiffnesses to pitch, roll, bounce, and warp (e.g., each of these vehicle motion modes are illustrated in panel 150).

Figure 9:
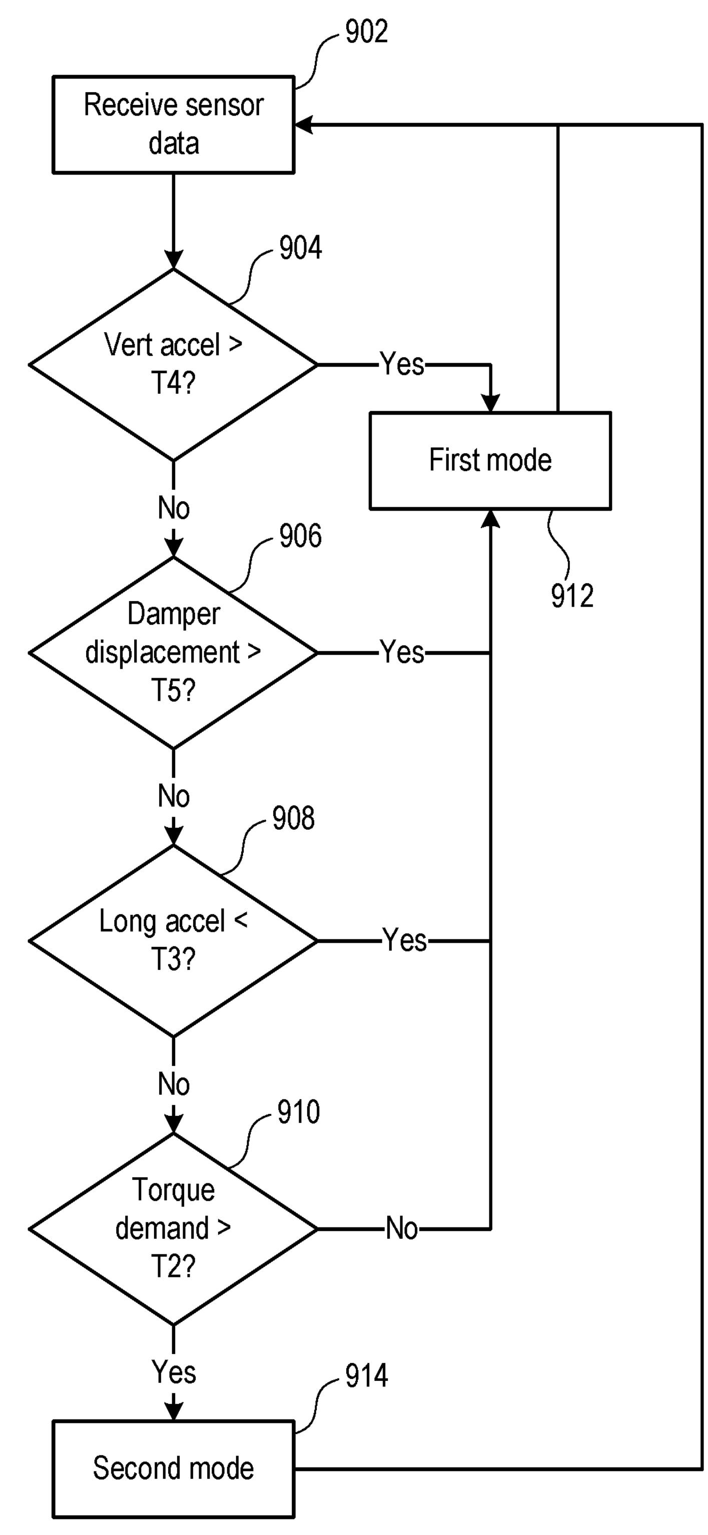
FIG. 9 is a flow chart of an illustrative process for managing a suspension system, in accordance with some embodiments of the present disclosure.

FIG. 9 illustrates a flow diagram of an example process 900 for managing suspension modes based on sensor data in accordance with one or more implementations of the subject technology. For explanatory purposes, the process 900 is primarily described herein with reference to the vehicles and/or systems described herein and/or various components thereof. However, one or more blocks (or operations) of the process 900 may be performed by one or more other structural components and/or of other suitable moveable apparatuses, devices, or systems. Further, for explanatory purposes, some of the blocks of the process 900 are described herein as occurring in serial, or linearly. However, multiple blocks of the process 900 may occur in parallel. In addition, the blocks of the process 900 need not be performed in the order shown and/or one or more blocks of the process 900 need not be performed and/or can be replaced by other operations. In some embodiments, instructions for implementing process 900 for managing a suspension system are stored in memory (e.g., non-transitory computer readable memory such as memory 212) and executed by control circuitry (e.g., control circuitry 211).

At block 902, a vehicle may obtain, by a processor (e.g., control circuitry 211), sensor data from at least one sensor of the vehicle. In some embodiments, the sensor data can include or indicate a vertical acceleration of the vehicle, a damper displacement of one or more shock absorbers of the vehicle, a longitudinal acceleration of the vehicle, a torque demand and/or torque rate demand, a longitudinal speed of the vehicle, and the like.

At block 904, the vehicle may, by a processor (e.g., the control circuitry 211), compare the detected vertical acceleration of the vehicle to a vertical acceleration threshold. Optionally, the vertical acceleration threshold can be based on the longitudinal speed of the vehicle. If the vertical acceleration exceeds the vertical acceleration threshold, the vehicle can determine, select, and/or achieve a first suspension mode of the suspension system and proceed to block 912. If the vertical acceleration does not exceed the vertical acceleration threshold, the process 900 can proceed to block 906.

At block 912, the vehicle can achieve the first suspension mode (e.g., roll stiffness mode), in which one or more control valves can be open to provide substantial roll stiffness with relatively less pitch stiffness. In the first suspension mode, the system can provide relatively lower pitch stiffness. As such, a greater magnitude and/or responsiveness of pitch adjustments are provided (e.g., due to relatively greater pitch stiffness). Such a configuration can be maintained while also limiting the magnitude and/or responsiveness of roll adjustments. With such a mode, ride characteristics can be enhanced. Following block 912, the process 900 can return to block 902 and/or another block and/or process.

At block 906, the vehicle may, by a processor (e.g., the control circuitry 211), compare the detected damper displacement of one or more shock absorbers of the vehicle to a damper displacement threshold. Optionally, the damper displacement threshold can be based on the longitudinal speed of the vehicle. If the damper displacement exceeds the damper displacement threshold, the vehicle can determine, select, and/or achieve the first suspension mode of the suspension system and proceed to block 912. If the damper displacement does not exceed the damper displacement threshold, the process 900 can proceed to block 908.

At block 908, the vehicle may, by a processor (e.g., the control circuitry 211), compare the detected longitudinal acceleration of the vehicle to a longitudinal acceleration threshold. If the longitudinal acceleration exceeds the longitudinal acceleration threshold, the vehicle can determine, select, and/or achieve the first suspension mode of the suspension system and proceed to block 912. If the longitudinal acceleration does not exceed the longitudinal acceleration threshold, the process 900 can proceed to block 910.

At block 910, the vehicle may, by a processor (e.g., the control circuitry 211), compare the detected torque demand and/or torque rate demand of the vehicle to a torque demand and/or torque rate demand threshold. If the torque demand and/or torque rate demand exceeds the torque demand and/or torque rate demand threshold, the vehicle can determine, select, and/or achieve the second suspension mode of the suspension system and proceed to block 914. If the torque demand and/or torque rate demand does not exceed the torque demand and/or torque rate demand threshold, the process 900 can achieve the first suspension mode of the suspension system and proceed to block 912.

At block 914, the vehicle may, by a processor (e.g., the control circuitry 211), achieve the second suspension mode (e.g., roll and pitch stiffness mode), in which one or more control valves can be closed to provide substantial roll stiffness and substantial pitch stiffness. In the second suspension mode, the system can provide relatively greater pitch stiffness. As such, the magnitude and/or responsiveness of pitch adjustments are limited (e.g., due to relatively greater pitch stiffness). Such a configuration can be maintained while also limiting the magnitude and/or responsiveness of roll adjustments. With such a mode, handling characteristics can be enhanced. Following block 914, the process 900 can return to block 902 and/or another block and/or process.

Figure 10:
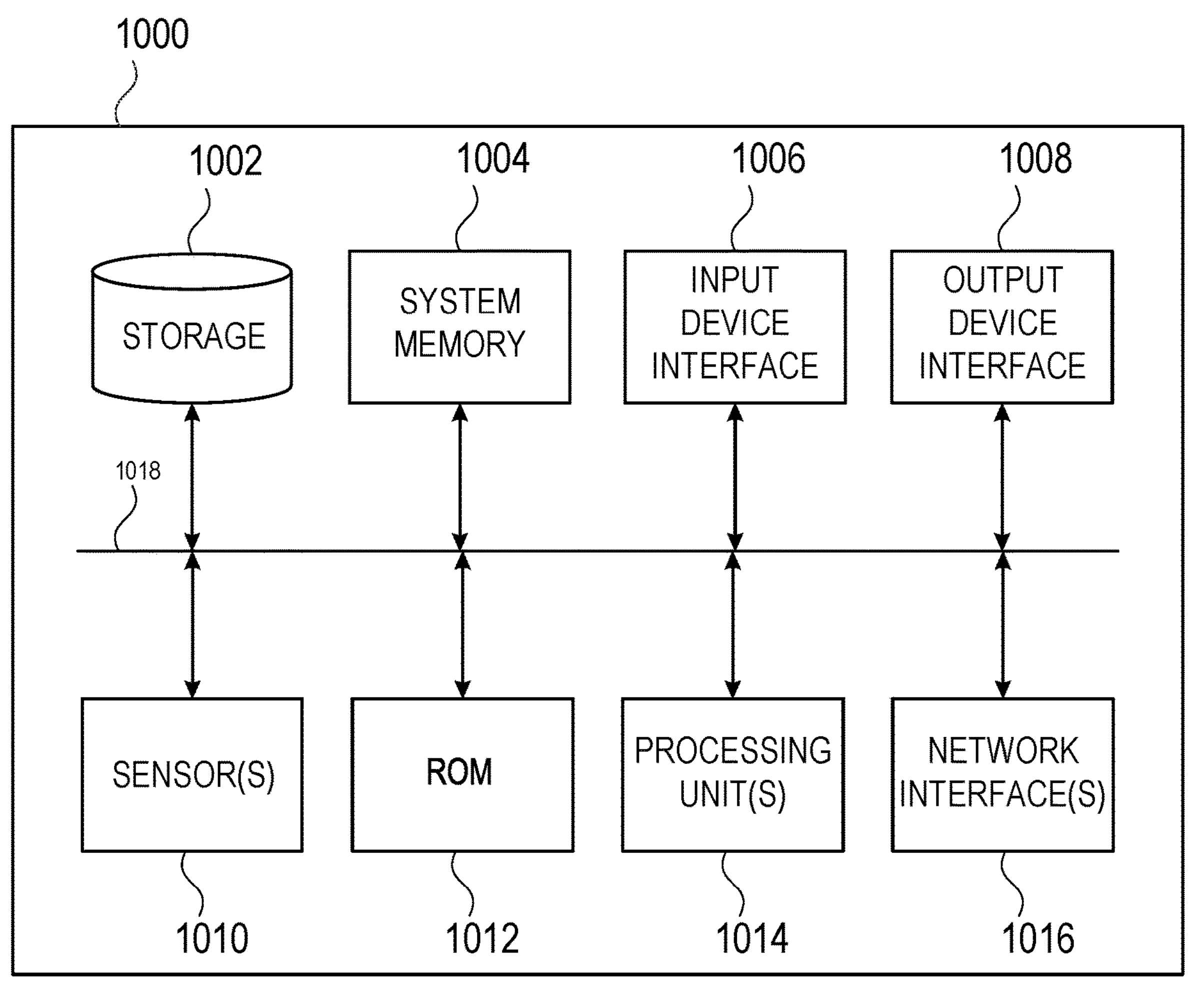
FIG. 10 is a block diagram of an illustrative process for managing a suspension system, in accordance with some embodiments of the present disclosure.

FIG. 10 illustrates an example electronic system 1000 with which aspects of the present disclosure may be implemented. The electronic system 1000 can be, and/or can be a part of, any electronic device for providing the features and performing processes described in reference to FIGS. 1-9, including but not limited to a vehicle, computer, server, smartphone, and wearable device (e.g., authentication device). The electronic system 1000 may include various types of computer-readable media and interfaces for various other types of computer-readable media. The electronic system 1000 includes a persistent storage device 1002, system memory 1004 (and/or buffer), input device interface 1006, output device interface 1008, sensor(s) 1010, ROM 1012, processing unit(s) 1014, network interface 1016, bus 1018, and/or subsets and variations thereof.

The bus 1018 collectively represents all system, peripheral, and chipset buses that communicatively connect the numerous internal devices and/or components of the electronic system 1000, such as any of the components of the vehicle 100 discussed above with respect to FIG. 2. In one or more implementations, the bus 1018 communicatively connects the one or more processing unit(s) 1014 with the ROM 1012, the system memory 1004, and the persistent storage device 1002. From these various memory units, the one or more processing unit(s) 1014 retrieves instructions to execute and data to process in order to execute the processes of the subject disclosure. The one or more processing unit(s) 1014 can be a single processor or a multi-core processor in different implementations. In one or more implementations, one or more of the processing unit(s) 1014 may be included on an ECU 204, such as in the form of the processor 206.

The ROM 1012 stores static data and instructions that are needed by the one or more processing unit(s) 1014 and other modules of the electronic system 1000. The persistent storage device 1002, on the other hand, may be a read-and-write memory device. The persistent storage device 1002 may be a non-volatile memory unit that stores instructions and data even when the electronic system 1000 is off. In one or more implementations, a mass-storage device (such as a magnetic or optical disk and its corresponding disk drive) may be used as the persistent storage device 1002.

In one or more implementations, a removable storage device (such as a floppy disk, flash drive, and its corresponding disk drive) may be used as the persistent storage device 1002. Like the persistent storage device 1002, the system memory 1004 may be a read-and-write memory device. However, unlike the persistent storage device 1002, the system memory 1004 may be a volatile read-and-write memory, such as RAM. The system memory 1004 may store any of the instructions and data that one or more processing unit(s) 1014 may need at runtime. In one or more implementations, the processes of the subject disclosure are stored in the system memory 1004, the persistent storage device 1002, and/or the ROM 1012. From these various memory units, the one or more processing unit(s) 1014 retrieves instructions to execute and data to process in order to execute the processes of one or more implementations.

The persistent storage device 1002 and/or the system memory 1004 may include one or more machine learning models. Machine learning models, such as those described herein, are often used to form predictions, solve problems, recognize objects in image data, and the like. For example, machine learning models described herein may be used to predict whether an authorized user is approaching a vehicle and intends to open a charging port closure. Various implementations of the machine learning model are possible. For example, the machine learning model may be a deep learning network, a transformer-based model (or other attention-based models), a multi-layer perceptron or other feed-forward networks, neural networks, and the like. In various examples, machine learning models may be more adaptable as machine learning models may be improved over time by re-training the models as additional data becomes available.

The bus 1018 also connects to the input device interfaces 1006 and output device interfaces 1008. The input device interface 1006 enables a user to communicate information and select commands to the electronic system 1000. Input devices that may be used with the input device interface 1006 may include, for example, alphanumeric keyboards, touch screens, and pointing devices. The output device interface 1008 may enable the electronic system 1000 to communicate information to users. For example, the output device interface 1008 may provide the display of images generated by electronic system 1000. Output devices that may be used with the output device interface 1008 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information.

One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

The bus 1018 also connects to sensor(s) 1010. The sensor(s) 1010 may include a location sensor, which may be used in determining device position based on positioning technology. For example, the location sensor may provide for one or more of GNSS positioning, wireless access point positioning, cellular phone signal positioning, Bluetooth signal positioning, image recognition positioning, and/or an inertial navigation system (e.g., via motion sensors such as an accelerometer and/or gyroscope). In one or more implementations, the sensor(s) 1010 may be utilized to detect movement, travel, and orientation of the electronic system 1000. For example, the sensor(s) may include an accelerometer, a rate gyroscope, and/or other motion-based sensor(s). The sensor(s) 1010 may include one or more biometric sensors and/or image sensors for authenticating a user.

The bus 1018 also couples the electronic system 1000 to one or more networks and/or to one or more network nodes through the one or more network interface(s) 1016. In this manner, the electronic system 1000 can be a part of a network of computers (such as a local area network or a wide area network). Any or all components of the electronic system 1000 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

The following application is hereby incorporated by reference in its entirety, as if fully set forth herein: U.S. Pub. No. 2023/0302864.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like can be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes can be performed in different order. Some of the steps, operations, or processes can be performed simultaneously. The accompanying method claims, if any, present elements of the various steps, operations or processes in a sample order, and are not meant to be limited to the specific order or hierarchy presented. These can be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein can be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for".

Those of skill in the art would appreciate that the various illustrative blocks, modules, elements, components, methods, and algorithms described herein can be implemented as hardware, electronic hardware, computer software, or combinations thereof. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks can be arranged differently (e.g., arranged in a different order, or partitioned in a different way) all without departing from the scope of the subject technology.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A method for managing a suspension system of a vehicle, the method comprising:

obtaining, by a processor, sensor data from at least one sensor of the vehicle, the sensor data indicating a torque demand and a longitudinal acceleration of the vehicle;

determining, based on the sensor data, a suspension mode for the vehicle; and transmitting, using control circuitry, a control signal for achieving the suspension mode to a control valve that is operable to fluidly connect each of multiple hydraulic lines to each other, the multiple hydraulic lines being fluidly connected to multiple shock absorbers of the vehicle, wherein:

in accordance with a determination that the sensor data indicates that the torque demand exceeds a first threshold, the control signal includes an instruction to operate the control valve to fluidly connect each of the multiple hydraulic lines; and in accordance with a determination that the sensor data indicates that the longitudinal acceleration does not exceed a second threshold, the control signal includes an instruction to operate the control valve to fluidly separate the multiple hydraulic lines.

2. The method of claim 1, wherein:

the sensor data further indicates a torque rate demand; and if the sensor data indicates that the torque rate demand exceeds a third threshold, the control signal includes the instruction to operate the control valve to fluidly connect each of the multiple hydraulic lines.

3. The method of claim 1, wherein the suspension mode is one of multiple available modes comprising:

a first mode in which the control valve is open to fluidly connect two of the multiple hydraulic lines to each other; and a second mode in which the control valve is closed to fluidly separate the two of the multiple hydraulic lines from each other.

4. The method of claim 3, wherein:

in the first mode, the multiple shock absorbers are fluidly connected to each other to facilitate adjustments to a roll stiffness of the vehicle; and in the second mode, the multiple shock absorbers are fluidly separated from each other to facilitate adjustments to the roll stiffness of the vehicle and a pitch stiffness of the vehicle.

5. The method of claim 1, wherein:

the sensor data further indicates a vertical acceleration of the vehicle; and when the sensor data indicates that the vertical acceleration exceeds a fourth threshold, the control signal includes the instruction to operate the control valve to fluidly separate the multiple hydraulic lines.

6. The method of claim 5, wherein:

the sensor data further indicates a damper displacement of at least one of the multiple shock absorbers of the vehicle; and when the sensor data indicates that the damper displacement exceeds a fifth threshold, the control signal includes the instruction to operate the control valve to fluidly separate the multiple hydraulic lines.

7. The method of claim 1, wherein:

the control valve is a first control valve;

the vehicle comprises a second control valve;

the multiple shock absorbers comprise:

a first shock absorber comprising a first compression volume and a first rebound volume;

a second shock absorber comprising a second compression volume and a second rebound volume;

a third shock absorber comprising a third compression volume and a third rebound volume; and a fourth shock absorber comprising a fourth compression volume and a fourth rebound volume;

the first control valve is operable to controllably fluidly interconnect the second rebound volume, the third compression volume, the fourth rebound volume, and the first compression volume; and the second control valve is operable to controllably fluidly interconnect the first rebound volume, the fourth compression volume, the third rebound volume, and the second compression volume.

8. A method for managing a suspension system of a vehicle, the method comprising:

obtaining, by a processor, sensor data from at least one sensor of the vehicle, the sensor data indicating a vertical acceleration of the vehicle;

based on the sensor data, determining a suspension mode for the vehicle; and transmitting, using control circuitry, a control signal for achieving the suspension mode to a control valve that is operable to fluidly connect each of multiple hydraulic lines to each other, the multiple hydraulic lines being fluidly connected to multiple shock absorbers of the vehicle.

9. The method of claim 8, wherein, when the sensor data indicates that the vertical acceleration exceeds a threshold, the control signal includes an instruction to operate the control valve to fluidly connect the multiple hydraulic lines.

10. The method of claim 9, wherein the threshold is determined based on a longitudinal speed of the vehicle.

11. The method of claim 8, wherein the suspension mode is one of multiple available modes comprising:

a first mode in which the control valve is open to fluidly connect two of the multiple hydraulic lines to each other; and a second mode in which the control valve is closed to fluidly separate the two of the multiple hydraulic lines from each other.

12. The method of claim 11, wherein;

in the first mode, the multiple shock absorbers are fluidly connected to each other to facilitate adjustments to a roll stiffness of the vehicle; and in the second mode, the multiple shock absorbers are fluidly separated from each other to facilitate adjustments to the roll stiffness of the vehicle and a pitch stiffness of the vehicle.

13. The method of claim 8, wherein:

the control valve is a first control valve;

the vehicle comprises a second control valve;

the multiple shock absorbers comprise:

a first shock absorber comprising a first compression volume and a first rebound volume;

a second shock absorber comprising a second compression volume and a second rebound volume;

a third shock absorber comprising a third compression volume and a third rebound volume; and a fourth shock absorber comprising a fourth compression volume and a fourth rebound volume;

the first control valve is operable to controllably fluidly interconnect the second rebound volume, the third compression volume, the fourth rebound volume, and the first compression volume; and the second control valve is operable to controllably fluidly interconnect the first rebound volume, the fourth compression volume, the third rebound volume, and the second compression volume.

14. A semiconductor device for a vehicle, the semiconductor device comprising:

circuitry configured to:

obtain sensor data from at least one sensor of the vehicle, the sensor data indicating a damper displacement of at least one of multiple shock absorbers of the vehicle;

determine, based on the sensor data, a respective suspension mode for the vehicle; and transmit a control signal for achieving the respective suspension mode to a control valve that is operable to fluidly connect each of multiple hydraulic lines to each other, the multiple hydraulic lines being fluidly connected to the multiple shock absorbers, wherein:

in accordance with a determination that the damper displacement exceeds a threshold, the respective suspension mode is a first mode in which the control valve is open to fluidly connect the multiple hydraulic lines to each other; and in accordance with a determination that the damper displacement does not exceed the threshold, the respective suspension mode is a second mode in which the control valve is closed to fluidly separate at least some of the multiple hydraulic lines from each other.

15. The semiconductor device of claim 14, wherein:

in accordance with the determination that the damper displacement exceeds the threshold, the control signal includes an instruction to operate the control valve to fluidly connect the multiple hydraulic lines to each other; and in accordance with the determination that the damper displacement does not exceed the threshold, the control signal includes an instruction to operate the control valve to fluidly separate the at least some of the multiple hydraulic lines from each other.

16. The semiconductor device of claim 14, wherein the threshold is determined based on a longitudinal speed of the vehicle.

17. The semiconductor device of claim 14, wherein:

in the first mode, the multiple shock absorbers are fluidly connected to each other to facilitate adjustments to a roll stiffness of the vehicle; and in the second mode, at least some of the multiple shock absorbers are fluidly separated from each other to facilitate adjustments to the roll stiffness of the vehicle and a pitch stiffness of the vehicle.

18. The semiconductor device of claim 14, wherein:

the control valve is a first control valve;

the vehicle comprises a second control valve;

the multiple shock absorbers comprise:

a first shock absorber comprising a first compression volume and a first rebound volume;

a second shock absorber comprising a second compression volume and a second rebound volume;

a third shock absorber comprising a third compression volume and a third rebound volume; and a fourth shock absorber comprising a fourth compression volume and a fourth rebound volume;

the first control valve is operable to controllably fluidly interconnect the second rebound volume, the third compression volume, the fourth rebound volume, and the first compression volume; and the second control valve is operable to controllably fluidly interconnect the first rebound volume, the fourth compression volume, the third rebound volume, and the second compression volume.

19. The semiconductor device of claim 14, wherein each of the multiple hydraulic lines extends from the control valve to connect at least two of the multiple shock absorbers to each other.

* * * * *